(12) United States Patent
Welch et al.

(10) Patent No.: US 7,225,666 B2
(45) Date of Patent: Jun. 5, 2007

(54) TIRE PRESSURE LEAK DETECTION METHOD AND SYSTEM

(75) Inventors: Shawn M. Welch, Spring, TX (US); Victor A. McCarthy, Kingwood, TX (US)

(73) Assignee: Honeywell International Inc., Morris Township, NJ (US)

( * ) Notice: Subject to any disclaimer, the term of this patent is extended or adjusted under 35 U.S.C. 154(b) by 46 days.

(21) Appl. No.: 11/032,804

(22) Filed: Jan. 11, 2005

(65) Prior Publication Data

US 2005/0241380 A1 Nov. 3, 2005

Related U.S. Application Data

(60) Provisional application No. 60/566,072, filed on Apr. 29, 2004.

(51) Int. Cl.
*E01C 23/02* (2006.01)
*B60C 23/02* (2006.01)

(52) U.S. Cl. ........................................................ 73/146
(58) Field of Classification Search ........ 73/146–146.8
See application file for complete search history.

(56) References Cited

U.S. PATENT DOCUMENTS

| | | | |
|---|---|---|---|
| 4,938,056 A | | 7/1990 | DeRudder et al. |
| 5,546,789 A | * | 8/1996 | Balke et al. ..................... 73/40 |
| 5,587,698 A | * | 12/1996 | Genna ......................... 340/442 |
| 5,853,020 A | | 12/1998 | Widner |
| 5,886,624 A | | 3/1999 | Hebert |
| 6,671,646 B2 | | 12/2003 | Manegold et al. |
| 6,868,358 B2 | * | 3/2005 | Brown, Jr. .................. 702/138 |
| 2003/0070477 A1 | | 4/2003 | Fisher et al. |
| 2003/0074961 A1 | * | 4/2003 | Fischer et al. ................ 73/146 |
| 2004/0017289 A1 | * | 1/2004 | Brown, Jr. .................. 340/442 |

OTHER PUBLICATIONS

Michelin Aircraft Tire Company, LLC. "Level Two; Course Guide & Test" Michelin Certified Tire Expert Program, Online Jan. 1, 2004, pp. 1-21, XP0002340688, Greenville, Retrieved from the Internet: URL: www. airmichelin.com> 'retrieved on Aug. 5, 2005, pp. 13-16.
Dunlap Aircraft Tyres Limited: "Aircraft Tyres and Tubes" General Practices Manual For Aircraft Tyres and Tubes General Practices Manual for Aircraft Tyres and Tubes DM1172, May 2, 2005, XP002340689, Erdington, Retrieved from the Internet: URL: www. dunlapaircrafttyres.com/tyrecare/dm1172/DM1172.pdf> 'retrieved on Aug. 16, 2005, paragraph '0003.

* cited by examiner

*Primary Examiner*—Max Noori
(74) *Attorney, Agent, or Firm*—Birch, Stewart, Kolasch & Birch, LLP

(57) ABSTRACT

A method of determining whether a tire will satisfy a t hour pressure retention standard in about x hours, where x is less than t, that involves determining a tire pressure stabilization time z (120), inflating a tire at time t0 to a first pressure (122), taking a first pressure measurement at (x-y) hours after t0 where (x-y)≧z (124), taking a second pressure measurement at x hours (126), determining a change in pressure between the first pressure measurement and the second pressure measurement (128) and determining from the change in pressure whether the tire will satisfy the t hour pressure retention standard (130).

7 Claims, 7 Drawing Sheets

| AIR RETENTION CALCULATOR | |
|---|---|
| MAIN WHEEL | |
| FIRST RETENTION PRESSURE | 200 |
| SECOND RETENTION PRESSURE | 199 |
| RETENTION HOURS | 2 |
| RETENTION MINUTES | 0.000 |
| INITIAL TEMPERATURE | 90.0 |
| END TEMPERATURE | 91.0 |
| FAIL | |
| MAIN WHEEL | |
| FIRST RETENTION PRESSURE | 220.3 |
| SECOND RETENTION PRESSURE | 220.0 |
| RETENTION HOURS | 2 |
| RETENTION MINUTES | 0.000 |
| INITIAL TEMPERATURE | 90.0 |
| END TEMPERATURE | 88.0 |
| PASS | |

FIG.4

| MAIN WHEEL CALCULATIONS | | |
|---|---|---|
| 62 — PRESSURE LOSS/GAIN DUE TO TEMP (PSI) | -0.400 | PRESSURE CORRECTION=1st RETENTION PRESSURE x TEMPERATURE EFFECT |
| 66 — PRESSURE LOSS MEASURED | 1 | 1st RETENTION PRESSURE-SECOND RETENTION PRESSURE |
| 68 — MINUTES CONVERTED | 0 | ACTUAL MINUTES ENTERED BY OPERATOR x .0166667 (ONE MINUTE IN DECIMAL FORMAT) |
| 70 — PERCENTAGE OF LOSS ALLOWED | 0.42% | ACTUAL HOURS + ACTUAL MINUTES (CONVERTED) x .2083% (MAXIMUM LOSS RATE IN ONE HOUR) |
| 72 — PSI LOSS ALLOWED | 0.4 | 1st RETENTION PRESSURE x PERCENTAGE OF LOSS ALLOWED + PRESSURE CORRECTION |
| 56 — TEMPERATURE DIFFERENCE | -1.000 | INITIAL TEMPERATURE ENTERED BY OPERATOR-END TEMPERATURE ENTERED BY OPERATOR |
| 58 — TEMPERATURE EFFECT | -0.20% | IF TEMPERATURE DIFFERENCE >0, TEMPERATURE DIFFERENCE x .0006(.3% EVERY 5 DEGREES), IF TEMPERATURE DIFFERENCE <0, TEMPERATURE DIFFERENCE x .0002(.1% EVERY 5 DEGREES) |
| 74 — MEASURED PSI LOSS WITH TEMPERATURE CHANGE | -0.6 | PSI ALLOWED LOSS-ACTUAL PRESSURE LOSS |

| NOSE WHEEL CALCULATIONS | | |
|---|---|---|
| 62 — PRESSURE LOSS/GAIN DUE TO TEMP (PSI) | 0.132 | PRESSURE CORRECTION=1st RETENTION PRESSURE x TEMPERATURE EFFECT |
| 66 — PRESSURE LOSS MEASURED | 0.5 | 1st RETENTION PRESSURE-SECOND RETENTION PRESSURE |
| 68 — MINUTES CONVERTED | 0 | ACTUAL MINUTES ENTERED BY OPERATOR x .0166667 (ONE MINUTE IN DECIMAL FORMAT) |
| 70 — PERCENTAGE OF LOSS ALLOWED | 0.42% | ACTUAL HOURS + ACTUAL MINUTES (CONVERTED) x .2083% (MAXIMUM LOSS RATE IN ONE HOUR) |
| 72 — PSI LOSS ALLOWED | 1.18 | 1st RETENTION PRESSURE x PERCENTAGE OF LOSS ALLOWED + PRESSURE CORRECTION +.122 PSI (ADJUSTMENT FOR NOSE WHEEL INSTALLATION/REMOVAL VARIATION) |
| 56 — TEMPERATURE DIFFERENCE | 1.000 | INITIAL TEMPERATURE ENTERED BY OPERATOR-END TEMPERATURE ENTERED BY OPERATOR |
| 58 — TEMPERATURE EFFECT | 0.06% | IF TEMPERATURE DIFFERENCE >0, TEMPERATURE DIFFERENCE x .0006(.3% EVERY 5 DEGREES), IF TEMPERATURE DIFFERENCE <0, TEMPERATURE DIFFERENCE x .0002(.1% EVERY 5 DEGREES) |
| 74 — MEASURED PSI LOSS WITH TEMPERATURE CHANGE | 0.68 | PSI ALLOWED LOSS-ACTUAL PRESSURE LOSS |

FIG.5

TIRE PRESSURE LEAK DETECTION METHOD AND SYSTEM

CROSS-REFERENCE TO RELATED APPLICATION

The present application claims the benefit of Provisional Patent Application No. 60/566,072, filed Apr. 29, 2004, the entire contents of which is hereby incorporated by reference.

FIELD OF THE INVENTION

The present invention is directed toward a method of tire pressure leak detection and, more specifically, toward a method of reducing the time required to determine whether a newly inflated aircraft tire is retaining air to a required degree.

BACKGROUND OF THE INVENTION

Airworthiness Directive 87-08-09 issued by the Federal Aviation Administration requires that tires on many large commercial aircraft be inflated with dry nitrogen that does not exceed 5% oxygen by volume to minimize the potential for an explosive chemical reaction between the inner tire lining and atmospheric oxygen. After tires are inflated in accordance with this directive, it has heretofore been necessary to perform a time-consuming testing process to ensure that they are not leaking or are leaking at an acceptably low rate. A conventional process for inflating and testing aircraft tires is discussed below with reference to FIG. 1 of the attached drawings.

FIG. 1 illustrates the steps involved in a conventional tire inflation and testing process. At a first step 300, a wheel is mounted so that the tire on the wheel can be inflated. At step 302, the wheel is staged in an inflation cage and hooked up to a source of pressurized nitrogen. Tire inflation is complete at step 304, and the wheel is staged in the final mechanic area at step 306. The time that step 306 is performed is documented on a tape or label, and the tape or label is affixed to or associated with the wheel at step 308.

The tire stretches during the inflation process and continues to stretch for a period of time after inflation. Therefore, many manufacturers recommend that a tire be allowed to sit for a period of time, such as one hour, before pressure measurements are taken. This is because the increasing volume of the stretching tire will cause a small pressure drop even though the tire is not leaking. The tire is allowed to stretch at step 310 for a period of one hour, and a pressure measurement is taken at step 312.

Next, the tire is checked for leaks by applying a soapy water solution to the tire and watching for the formation of air bubbles at step 314. A determination is made at step 316 as to whether the tire passes this leak test. If the tire fails, that is, if escaping gas bubbles are noted, the tire is re-inspected and/or repaired at a step 318. If the tire is not visibly leaking, the wheel is staged at step 320 for a period of 12 to 24 hours to determine whether it holds pressure to an adequate degree over this period. Industry guidelines permit up to a 2.5 percent pressure loss over 12 hours. Tire pressure is measured after 12 to 24 hours at step 322, and if the tire passes inspection, the passing pressure level is recorded at step 324. A final inspection of the wheel and tire is performed at step 326.

As will be appreciated from the above, the conventional method includes a minimum waiting period of thirteen hours after inflation to ensure that the tire is retaining pressure. Including the time required for mounting, dismounting and taking and recording measurements, the tire inspection process requires more that thirteen hours. Therefore, when an aircraft tire requires inflation or reinflation, an airline will lose the use of that tire for over thirteen hours. This is longer than the typical overnight down-time for a plane and can result in expensive delays to an airline. Thus, maintenance facilities may be required to keep on hand a supply of properly inflated tires for various aircraft and/or take other expensive steps to minimize this problem.

It would therefore be desirable to provide a method of reducing the time required to determine whether a newly inflated aircraft tire is retaining pressure to a required degree.

SUMMARY OF THE INVENTION

This problem and others are addressed by the present invention which comprises, in a first embodiment, a method of inspecting aircraft tires that can be completed in approximately six hours, or less than one half the time required for conventional inspection methods. A system for use in practicing the present inspection method is also disclosed.

Another aspect of the invention comprises a method of aircraft tire inspection that involves inflating an aircraft tire, taking a first pressure measurement of tire pressure about four hours after inflating the tire, taking a second pressure measurement of tire pressure about two hours after the first measurement, determining a difference between the first pressure measurement and the second pressure measurement and determining whether the difference is indicative of an acceptable leakage rate.

A further aspect of the invention comprises a method of tire inspection that involves inflating a tire, allowing the tire to rest until a moving one hour average of tire pressure loss for the tire falls below 0.1 percent, after allowing the tire to rest, taking a first tire pressure measurement at a first time, taking a second tire pressure measurement at a second time after the first time, and determining whether a difference between the first tire pressure measurement and the second tire pressure measurement is indicative of an acceptable leakage rate.

Another aspect of the invention comprises a method of determining whether a tire will satisfy a t hour pressure retention standard in about x hours where x is less than t that involves determining a tire pressure stabilization time z, inflating a tire at time t0 to a first pressure, taking a first pressure measurement at (x–y) hours after t0 where $(x-y) \geq z$, taking a second pressure measurement at x hours, determining a change in pressure between the first pressure measurement and the second pressure measurement, and determining from the change in pressure whether the tire will satisfy the t hour pressure retention standard.

A further aspect of the invention comprises a tire pressure retention calculator comprising an input mechanism for inputting starting and ending tire pressure data, starting and ending tire temperature data and a percentage of loss allowed. The calculator also includes a calculating mechanism for calculating from the tire pressure data a tire pressure change calculating from the tire temperature data a tire temperature change and a temperature effect, and calculating from the starting tire pressure and temperature effect a pressure loss allowed. The calculator also includes a determining mechanism for determining from the pressure loss allowed and ending tire pressure whether the tire pressure change is greater than or less than the pressure loss allowed.

BRIEF DESCRIPTION OF THE DRAWINGS

FIG. 4 is a display output by a computer calculating whether a given tire passes or fails an inflation test according to the present invention;

FIG. 5 is a chart showing data generated from user data input in the computer of FIG. 4;

DETAILED DESCRIPTION

Figure 1:
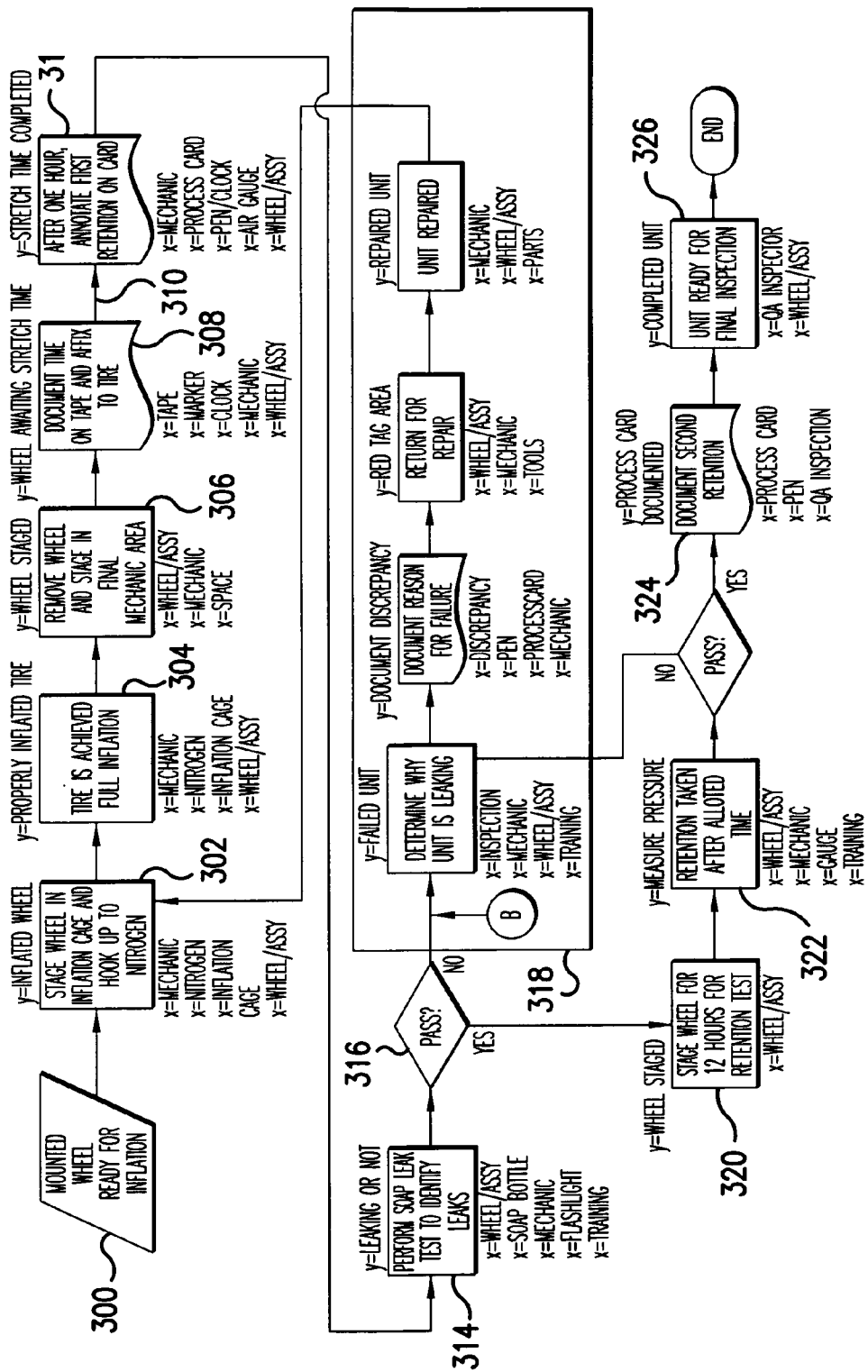
FIG. 1 is a flow chart illustrating steps followed in a conventional tire inspection process.
Figure 2:
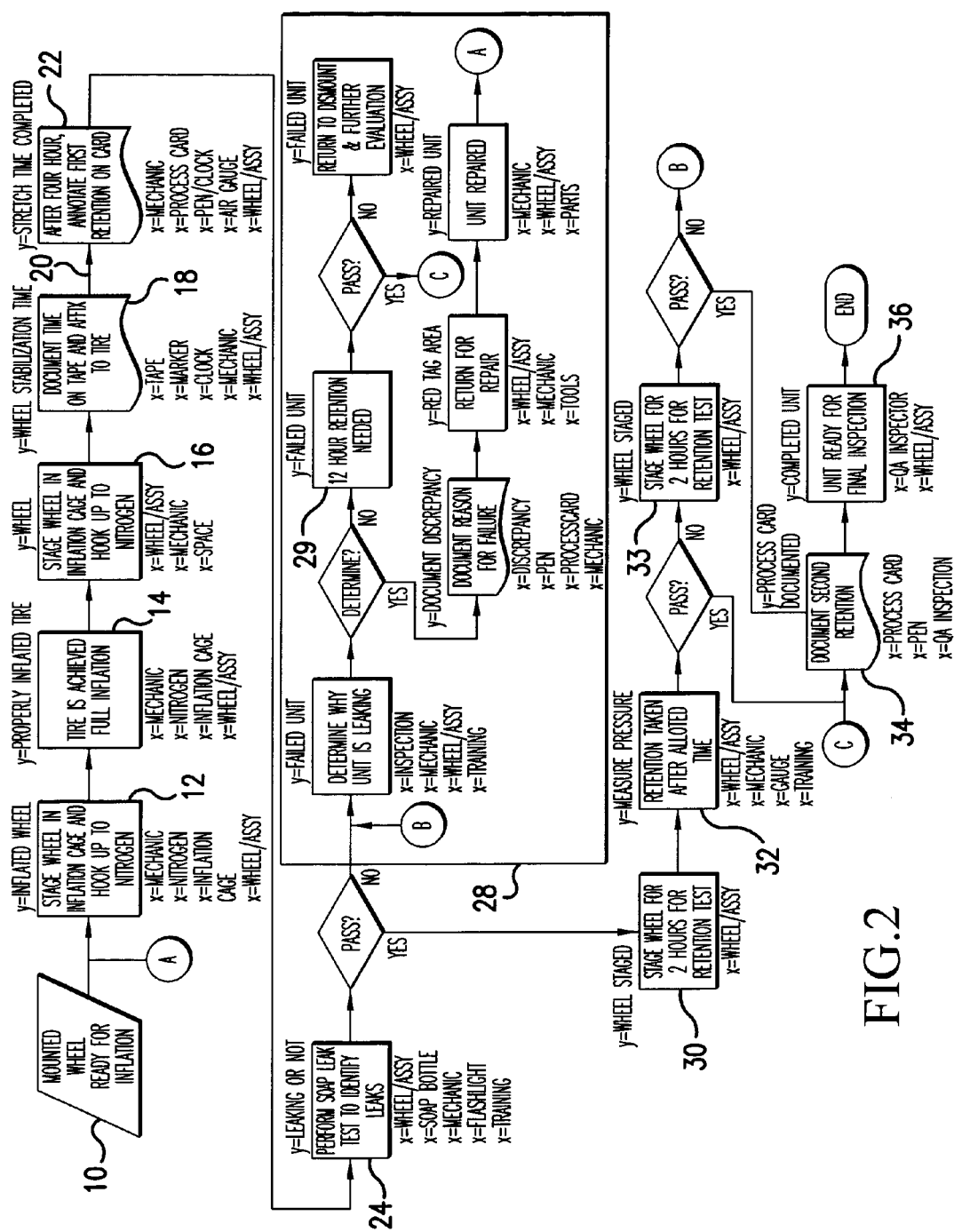
FIG. 2 is a flow chart illustrating steps followed in the tire inspection process of an embodiment of the present invention.

Referring now to the drawings, wherein the showings are for purposes of illustrating preferred embodiments of the invention only, and not for the purpose of limiting same, FIG. 2 illustrates a method of tire inflation and inspection according to an embodiment of the present invention. According to this method, a wheel is appropriately mounted at a step 10 so that the tire associated with the wheel can be inflated. At step 12, the wheel is staged in an inflation cage and hooked up to a source of pressurized nitrogen. Tire inflation is complete at step 14, and the wheel is staged in a holding area at step 16. The time at which step 16 is performed is documented on a tape or label, and the tape or label is affixed to or associated with the wheel at step 18.

Figure 3:
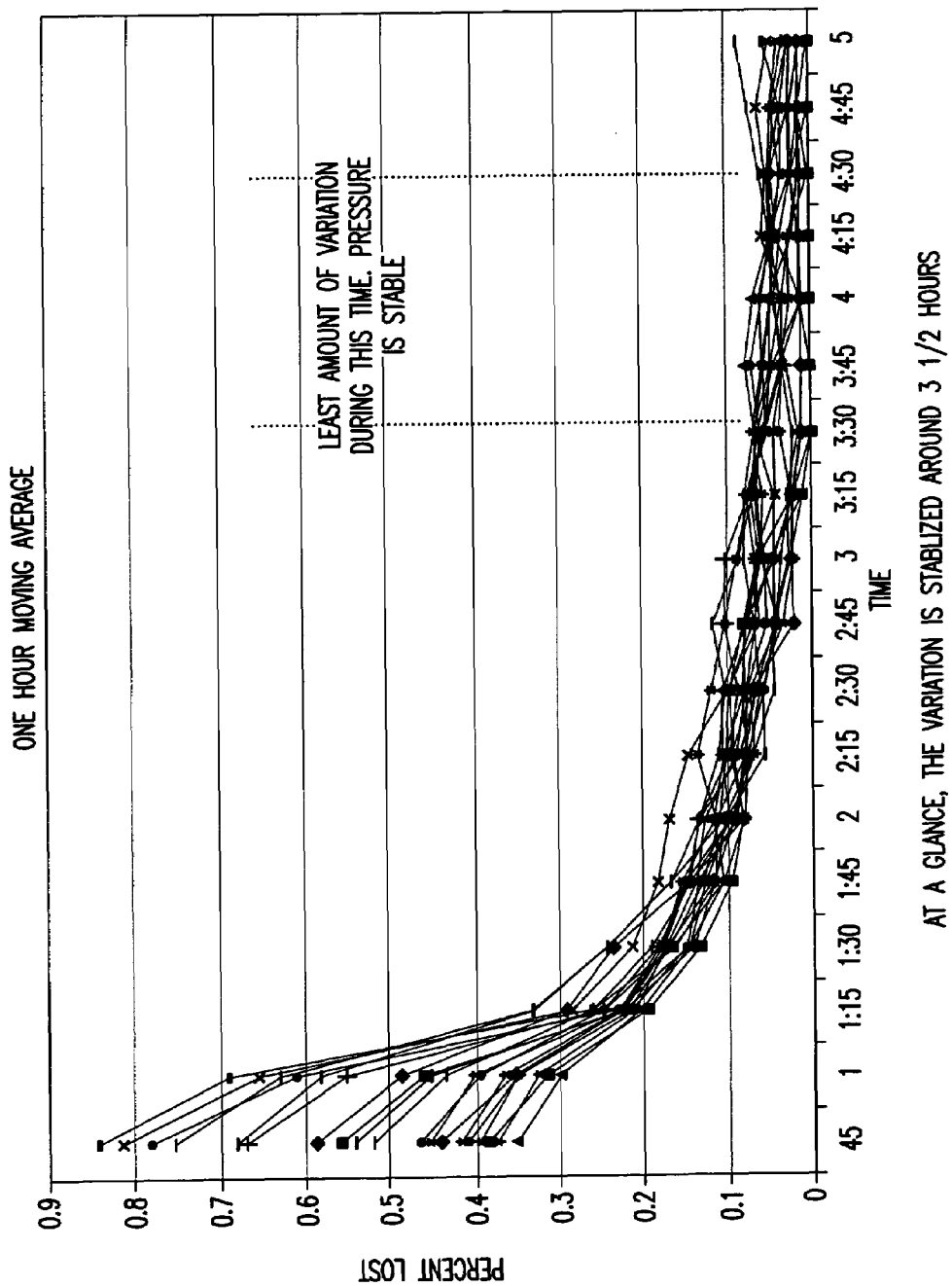
FIG. 3 is a graph illustrating the relationship between tire pressure loss and time for a number of different tires.

The inflated tire stretches during the inflation process and continues to stretch for a period of time after inflation. Therefore, many manufacturers recommend that a tire be allowed to sit for a period of time, such as one hour, before pressure measurements are taken. However, as illustrated by FIG. 3, the present inventors have found that tire pressure drops significantly for at least 3.5 hours after inflation. The amount of pressure loss due to tire stretch has heretofore not been appreciated. Consequently, conventional measurements that compare tire pressure one hour after inflation with tire pressure 12 to 24 hours after inflation are measuring a combination of pressure loss due to tire stretch and gas leakage. A 12 to 24 hour retention period has thus been believed to be necessary to identify leaking tires before they are mounted on an aircraft. FIG. 3, however, indicates that pressure change due to tire stretch stabilizes at approximately 3.5 hours, and that, after four hours, tire pressure is essentially stable. Thus, according to the method of an embodiment of the present invention, a tire is allowed to sit for a period of about four hours at step 20, and a first pressure measurement is taken at step 22.

Next, the tire is checked for leaks by applying a soapy water solution to the tire and watching for the formation of air bubbles at step 24. A determination is made at step 26 as to whether the tire passes this leak test. If the tire fails, that is, if escaping gas bubbles are noted, the tire is reinspected and/or repaired at a step 28. Step 28 may include a 12 hour retention test step 29 to help determine the nature of the leak.

If the tire is not visibly leaking, the wheel is staged at step 30 for a period of 2 to 12 hours to determine whether it holds pressure to an adequate degree over this period.

Industry guidelines permit up to a 2.5 percent pressure loss over 12 hours. The present inventors have found that checking for a 0.416 percent loss after two hours is equivalent to a finding of a 2.5 percent loss over 12 hours. Tires that satisfy this two hour retention test also are within the 2.5 percent pressure loss limit when retested after 12 hours. Thus, after a total of only six hours of waiting time, an accurate determination of tire pressure retention can be made. A second pressure measurement is taken after two hours at a step 32, the second pressure is documented at a step 34, and a final inspection is performed on the wheel and tire at step 36.

Tires that initially fail the retention test at step 32 are allowed to sit for an additional two hours at a step 33 before a second pressure measurement is taken. This second check helps identify instances where the pressure loss was due to an improperly attached pressure gauge rather than to a problem with the tire or wheel.

Thus, using the method of an embodiment of the present invention, the time required for inspecting airline tires can be reduced by more than half, the throughput of a tire inspection facility can be more than doubled, and a tire inflated at the end of a commercial airliner's day can be ready for use the following morning.

The 3.5 to 4 hour stabilization time described above was determined empirically from pressure measurements taken on a number of currently used aircraft nose and main landing gear tires. However, more generally, the present method involves waiting for a tire to stabilize before taking a first pressure measurement. Stabilization in a general sense means that pressure changes caused by the stretching of the tire have reached an acceptably low level. The stabilization time for a different set of tires may be different from that of the set of tires tested.

Therefore, as used herein, the term "stabilization time" may have one of two meanings. In a first sense, "stabilization time" or stabilization is a measure of the amount of time necessary for tire pressure to stabilize to such an extent that two pressure measurements taken over a first period after stabilization can be extrapolated to accurately predict whether the tire will subsequently satisfy a longer pressure retention standard. Thus, for example, a pressure retention standard may require pressure measurements over a period of t hours. However, if the tires are allowed to stabilize for a period of time z hours, where z<t, then two pressure measurements taken at first and second times after time z will accurately predict whether the same tires will satisfy the full t hour retention standard.

Alternately, "stabilization" has occurred when the slope of a one hour moving average of pressure loss percentage becomes close or equal to zero. FIG. 3 illustrates that from the set of tire types tested by the present inventors, the slope of a one hour moving average of pressure loss percentages becomes essentially horizontal after about three and one half hours. When the slope of the one hour moving average of pressure loss percentages reaches this slope, subsequent pressure loss can be accurately predicted.

In order to practice the above-described method, a pressure gauge accurate to 0.1 psi is required. A suitable pressure gauge is available from the Cecomp Electronics division of Absolute Process Instruments, Inc. located in Libertyville, Ill., model number DPG1000B300PSIG-5-400-HA. The pressure gauge should include a NIST certification and be recalibrated at least once a year to ensure continued accuracy. Highly accurate clocks are also desirable for ensuring that the times of pressure measurements are accurately recorded. Preferably, an atomic clock is used for this purpose, although any highly accurate clock will work.

Tire pressure varies with temperature. The foregoing discussion assumes a constant temperature from tire inflation at step 10 to the taking of a final pressure reading at step 32. However, especially in view of the small pressure changes that are being recorded using the method of the present invention, one should at least be aware of the potential for temperature changes to affect aircraft tire pressures.

Pressure variations caused by rising temperature are much less than those caused by decreasing temperature at a typical tire inflation pressure of 200 psi. An increase in temperature of 5 degrees changes the pressure 0.65 psi (0.3%), on average, in both main wheel tires and nose wheel tires. However pressure decreases at a rate of 1.9 psi (0.98%) for every 5 degrees at a starting pressure of 200 psi.

The variation at 100 psi for increasing temperature is much greater than that observed at 200 psi. The reason for this is believed to be the volume of the tire. At 200 psi, the volume and pressure are working against the force of the tire rubber being stretched; however, at 100 psi, the tire is not stretched to a stable volume. At 100 psi, each five degree increase in temperature produces a 1.375 psi increase (5.5%) on average. Every 5 degree decrease produced a 1 psi drop in pressure (1%).

The average time required to change the temperature inside the tire by 5 degrees when the ambient temperature is 20 degrees hotter than the tire starting temperature was found to be 82 minutes at 200 psi. When ambient temperature is 10 degrees hotter than the tire starting temperature, an average of 90 minutes was required to raise the tire temperature by 5 degrees. When temperature decreases, the average time required to drop 5 degrees is 30 minutes. If temperature is not held substantially constant during the tire inspection process, tire temperature when pressure readings are taken at step 20 and step 32 must be taken into account to adjust for any temperature induced pressure changes.

A small amount of air is released from an aircraft tire each time a pressure measurement is taken. It has been determined that a pressure measurement on a main wheel tire decreases tire pressure by an average of 0.0313 psi. This pressure decrease is small enough that it can safely be disregarded when calculating pressure drop. However, because they are significantly smaller than main wheels, nose wheels lose an average of 0.122 psi each time a pressure measurement is taken. This drop is significant, and should be taken into consideration when evaluating tire leakage. These losses can be avoided if a sufficiently accurate pressure sensor is mounted inside the tire and transmits pressure measurements to a receiver outside the tire.

FIG. 4 illustrates a readout from a calculator (which may comprise a spreadsheet run on a computer or PDA, or be implemented as a hard-wired circuit) used to determine whether a given wheel passes or fails inspection based on an initial pressure reading, a final pressure reading, and starting and ending temperatures. In this embodiment, the calculator is implemented as a spreadsheet run on, for example, a computer or a PDA. FIG. 4 shows an example of data entered for an aircraft main wheel in first section 40 that includes a first retention pressure, entered in field 42, taken at step 22, and a second retention pressure, entered in field 44, taken at step 32. The time between step 22 and step 32, in other words, the first retention time, may be entered as a decimal in field 46. Alternately, the retention time can be entered as hours and minutes in first time field 46 and second time field 48 respectively, and the calculator will convert these values to a decimal number of hours. The initial temperature is entered in field 50 while the ending temperature is entered in field 52. Calculations are performed on these value as described below to produce either a pass or fail result displayed in field 54.

Referring now to FIG. 5, the calculations that produce the pass/fail results shown in the calculator of FIG. 4 will be explained. It should be noted that the fields shown in FIG. 5 are displayed to make the calculations easier to follow; in practice, these fields will generally not be visible to a user.

First a temperature difference is calculated by subtracting the end temperature from the initial temperature or the value of field 52 from the value of field 50, and this value is stored in a temperature difference field 56. Next, a temperature effect is calculated from the temperature difference field 56 and stored in a field 58. If the temperature difference is greater than 0, the temperature effect is calculated as the temperature difference multiplied by 0.0006, which represents a 0.3% pressure increase for each 5 degree temperature increase as described above. If the temperature difference is less than 0, the temperature effect is calculated as the temperature difference multiplied by 0.0002 which represents a 1% pressure loss for each 5 degrees of temperature decrease as described above.

A pressure correction is calculated from the temperature effect and the first retention pressure and stored in a field 62. Specifically, the first retention pressure is multiplied by the temperature effect stored in field 58, and the product is stored in field 62. A pressure loss is calculated by subtracting the second retention pressure in field 44 from the first retention pressure in field 42 and this difference is stored in field 66. A decimal value for the minutes entered in field 48 is calculated by multiplying the number of minutes in field 48 by 0.01667 and storing this value in field 68.

The percentage of pressure loss allowed is calculated and stored in field 70. This value is determined by adding the retention hours of field 46 to the decimal value of retention minutes from field 68 and multiplying this sum by 0.208 percent, the maximum percentage loss allowed per hour. A pressure allowed loss is calculated and stored in field 72. This value is obtained by multiplying the first retention pressure of field 42 by the percentage loss allowed of field 70 and adding the pressure correction from field 64. An actual pressure loss, calculated from the difference between the second retention pressure of field 44 and the first retention pressure of field 42 is stored in field 74.

The pressure allowed loss of field 72 is subtracted from the actual pressure loss of field 74, and if the difference is greater than 0, a passing message such as "Pass" is displayed in field 54. Otherwise, a failing message such as "Fail" is displayed in field 54.

Calculations for the nose wheel are carried out in a similar manner and displayed in section 41 and will not be described in detail. While not shown in this example, the 0.122 psi pressure loss caused by the attachment of a pressure gauge to the nose wheel should be taken into account when determining actual pressure loss. That is, the allowed pressure loss will be 0.244 psi higher than the allowed pressure loss for the main wheels to account for the two attachments of the pressure gauge to the nose wheel tire.

Figure 6:
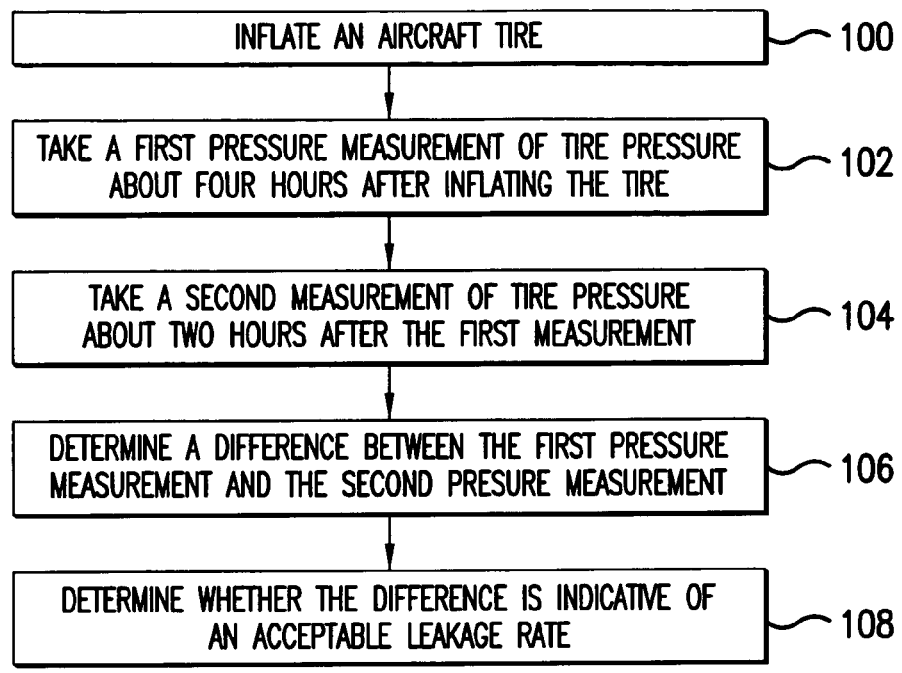
FIG. 6 is a flow chart illustrating steps followed in the tire inspection process of an embodiment of the present invention.

An embodiment of the invention is illustrated in FIG. 6 which comprises a method involving inflating an aircraft tire at a step 100, taking a first pressure measurement of tire pressure about four hours after inflating the tire at step 102, taking a second pressure measurement of tire pressure about two hours after the first measurement at a step 104, determining a difference between the first pressure measurement and the second pressure measurement at a step 106 and determining whether the difference is indicative of an acceptable leakage rate at a step 108.

Figure 7:
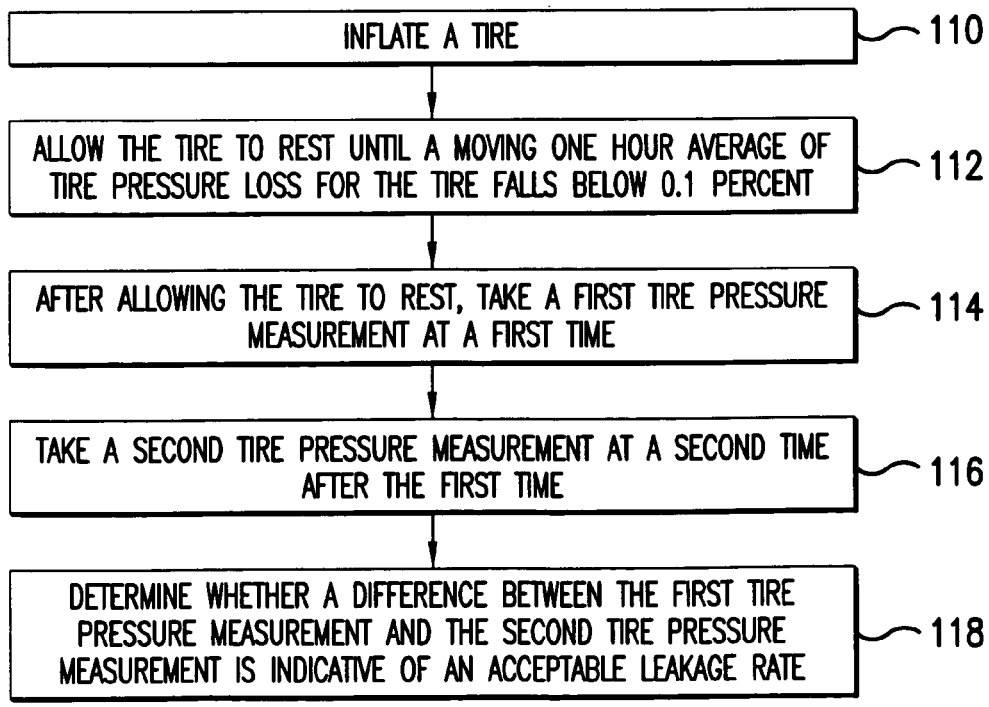
FIG. 7 is a flow chart illustrating steps followed in the tire inspection process of an embodiment of the present invention.

Another embodiment of the invention is illustrated in FIG. 7 and comprises a method that involves inflating a tire at a step 110, allowing the tire to rest until a moving one hour average of tire pressure loss for the tire falls below 0.1 percent at a step 112, taking a first tire pressure measurement at a first time at a step 114, taking a second tire pressure measurement at a second time after the first time at a step 116 and determining at a step 118 whether a difference between the first tire pressure measurement and the second tire pressure measurement is indicative of an acceptable leakage rate.

Figure 8:
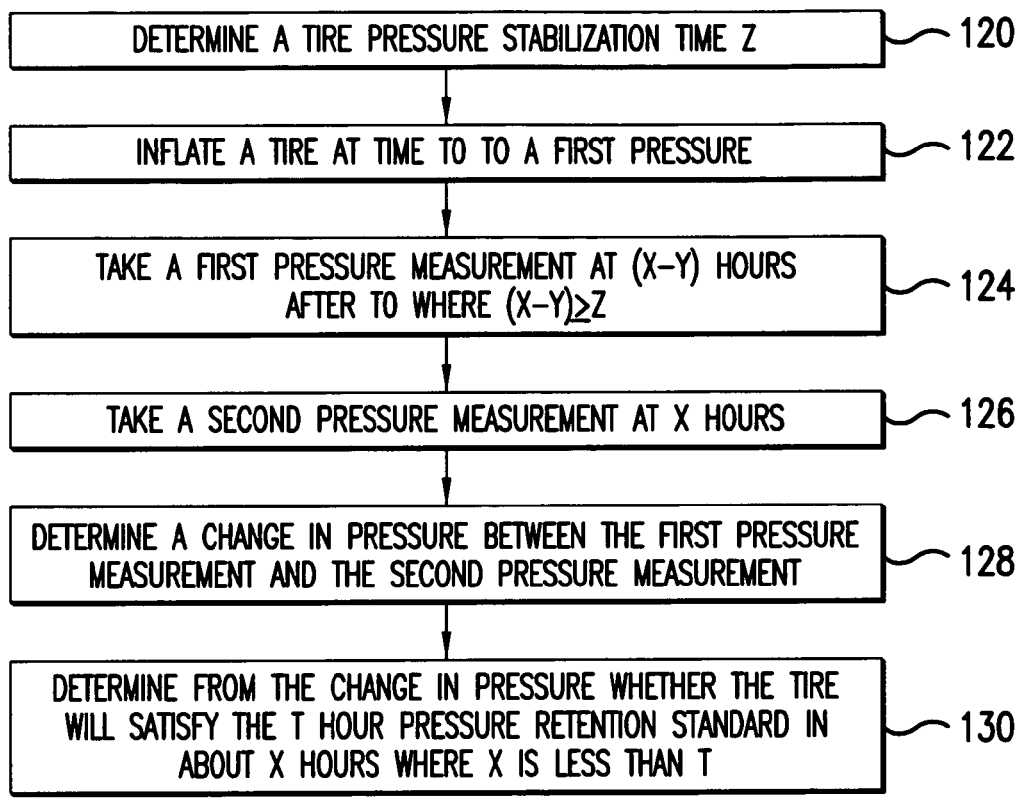
FIG. 8 is a flow chart illustrating steps followed in the tire inspection process of an embodiment of the present invention.

Another embodiment of the invention is illustrated in FIG. 8 and comprises a method that involves determining a tire pressure stabilization time Z at a step 120, inflating a tire at a time T0 to a first pressure at a step 122, taking a first pressure measurement at (X-Y) hours after T0 where (X-Y)≧Z at a step 124, taking a second pressure measurement at X hours at a step 126, determining a change in pressure between the first pressure measurement and the second pressure measurement at a step 128, and determining at a step 130 from the change in pressure whether the tire will satisfy the T hour pressure retention standard in about X hours where X is less than T.

The present invention has been described in terms of several embodiments. Obvious modifications and variations will become apparent to those skilled in the art upon a reading of the foregoing specification. It is intended that all such modifications and changes form a part of the subject invention to the extent they fall within the scope of the several claims appended hereto.

What is claimed is:

1. A method of aircraft tire inspection comprising the steps of:
   inflating an aircraft tire;
   taking a first pressure measurement of tire pressure about four hours after inflating the tire;
   taking a second pressure measurement of tire pressure about two hours after the first measurement;
   determining a difference between the first pressure measurement and the second pressure measurement; and
   determining whether the difference is indicative of an acceptable leakage rate.

2. The method of claim 1 wherein said step of determining whether the difference is indicative of an acceptable leakage rate comprises the steps of:
   determining an acceptable 12 hour pressure loss;
   determining one sixth of the acceptable 12 hour pressure loss to obtain an acceptable two hour pressure loss; and
   determining whether the acceptable two hour pressure loss is greater than the difference between the first pressure measurement and the second pressure measurement.

3. The method of claim 2 including the additional steps of:
   taking a first temperature measurement when the first pressure measurement is taken;
   taking a second temperature measurement when the second pressure measurement is taken;
   determining a difference between the first temperature and the second temperature; and
   compensating for pressure changes caused by the temperature difference when determining the acceptable two hour pressure loss.

4. A method of tire inspection comprising the steps of:
   inflating a tire;
   allowing the tire to rest until a moving one hour average of tire pressure loss for the tire falls below 0.1 percent;
   after allowing the tire to rest, taking a first tire pressure measurement at a first time;
   taking a second tire pressure measurement at a second time after the first time; and
   determining whether a difference between the first tire pressure measurement and the second tire pressure measurement is indicative of an acceptable leakage rate.

5. The method of claim 4 wherein said step of determining whether a difference between the first tire pressure measurement and the second tire pressure measurement is indicative of an acceptable leakage rate comprises the step of comparing the pressure change between the first time and the second time with an acceptable pressure change over a time period longer than the time between the first time and the second time.

6. The method of claim 5 including the additional steps of measuring the temperature of the tire at the first time and measuring the temperature of the tire at the second time and wherein said step of determining whether a difference between the first tire pressure measurement and the second tire pressure measurement is indicative of an acceptable leakage rate comprises the step of compensating for pressure changes caused by a difference between the first temperature and the second temperature.

7. A tire pressure retention calculator comprising:
   input means for inputting starting and ending tire pressure data, starting and ending tire temperature data and a percentage of loss allowed;
   calculating means for calculating from the tire pressure data a tire pressure change; from the tire temperature data a tire temperature change and a temperature effect; and from the starting tire pressure and temperature effect a pressure loss allowed; and
   determining means for determining from the pressure loss allowed and ending tire pressure whether the tire pressure change is greater than or less than the pressure loss allowed indicating means for indicating whether tire pressure satisfy a given standard.

* * * * *